United States Patent
Ciesla et al.

(10) Patent No.: US 11,650,088 B2
(45) Date of Patent: May 16, 2023

(54) THERMAL FLOW SENSOR FOR DETERMINING THE TEMPERATURE AND THE FLOW VELOCITY OF A FLOWING MEASURING MEDIUM

(71) Applicant: Innovative Sensor Technology IST AG, Ebnat-Kappel (CH)

(72) Inventors: Tomasz Ciesla, Küsnacht (CH); Christoph Hepp, Wil (CH)

(73) Assignee: Innovative Sensor Technology IST AG, Ebnat-Kappel (CH)

( * ) Notice: Subject to any disclaimer, the term of this patent is extended or adjusted under 35 U.S.C. 154(b) by 326 days.

(21) Appl. No.: 16/956,910

(22) PCT Filed: Nov. 23, 2018

(86) PCT No.: PCT/EP2018/082314
§ 371 (c)(1),
(2) Date: Jun. 22, 2020

(87) PCT Pub. No.: WO2019/120873
PCT Pub. Date: Jun. 27, 2019

(65) Prior Publication Data
US 2020/0348159 A1    Nov. 5, 2020

(30) Foreign Application Priority Data
Dec. 21, 2017  (DE) .................. 10 2017 130 950

(51) Int. Cl.
*G01F 1/69*     (2006.01)
*G01F 1/696*    (2006.01)
(Continued)

(52) U.S. Cl.
CPC ................ *G01F 1/69* (2013.01); *G01F 1/696* (2013.01); *G01N 27/04* (2013.01)

(58) Field of Classification Search
CPC . G01F 1/69; G01F 1/696; G01F 1/684; G01F 1/6888; G01N 27/04; G01K 7/183; G01K 13/02; G01P 5/12
See application file for complete search history.

(56) References Cited

U.S. PATENT DOCUMENTS

2002/0130780 A1  9/2002  McQueen et al.
2003/0233860 A1  12/2003 Deane et al.
(Continued)

FOREIGN PATENT DOCUMENTS

DE       19952055 A1   5/2001
DE    102006005393 A1   8/2007
(Continued)

*Primary Examiner* — Herbert K Roberts
*Assistant Examiner* — Anthony W Megna Fuentes
(74) *Attorney, Agent, or Firm* — Mark A. Logan; Endress+Hauser (USA) Holding, Inc.

(57) ABSTRACT

The invention comprises a thermal flow sensor for determining the temperature and the flow velocity of a flowing measuring medium, comprising: a functional element which is configured to determine the temperature of the measuring medium and to influence the temperature of the measuring medium; and a control and evaluation unit which is configured to determine the temperature of the measuring medium in a first interval of time by means of the functional element and to determine the flow velocity of the measuring medium in a second interval of time following the first interval of time, and a method for determining the temperature and the flow velocity of the measuring medium by means of the thermal flow sensor according to the invention, and a sensor system comprising such a thermal flow sensor and a further sensor type.

17 Claims, 4 Drawing Sheets

(51) Int. Cl.
*G01N 27/04* (2006.01)
*G01F 1/684* (2006.01)
G01F 1/688 (2006.01)
G01K 13/02 (2021.01)
G01P 5/12 (2006.01)
G01K 7/18 (2006.01)

(56) References Cited

U.S. PATENT DOCUMENTS

2006/0162441 A1* 7/2006 Ando ................ G01F 1/684
 73/204.15
2006/0267724 A1 11/2006 Parsons
2016/0139071 A1* 5/2016 Nakano ............ G01N 27/121
 73/23.31
2017/0003155 A1 1/2017 McQueen

FOREIGN PATENT DOCUMENTS

| | | |
|---|---|---|
| DE | 102009026439 A1 | 12/2010 |
| DE | 102013114486 A1 | 6/2015 |
| DE | 102015114314 A1 | 3/2017 |
| DE | 102015115761 A1 | 3/2017 |
| WO | 2007063110 A1 | 6/2007 |
| WO | 2010136351 A2 | 12/2010 |
| WO | 2018041473 A1 | 3/2018 |

* cited by examiner

THERMAL FLOW SENSOR FOR DETERMINING THE TEMPERATURE AND THE FLOW VELOCITY OF A FLOWING MEASURING MEDIUM

CROSS-REFERENCE TO RELATED APPLICATIONS

The present application is related to and claims the priority benefit of German Patent Application No. 10 2017 130 950.0, filed on Dec. 21, 2017 and International Patent Application No. PCT/EP2018/082314, filed on Nov. 23, 2018 the entire contents of which are incorporated herein by reference.

TECHNICAL FIELD

The invention relates to a thermal flow sensor for determining the temperature and the flow velocity of a flowing measuring medium. The invention furthermore relates to a method for determining the temperature and the flow velocity of a measuring medium by means of a thermal flow sensor according to the invention, and to a sensor system comprising such a thermal flow sensor and a further sensor type.

BACKGROUND

Thermal flow sensors are known for determining a flow rate or the flow velocity of a measuring medium, or a fluid, for example of a gas or a gas mixture. These make use of the fact that a (flowing) measuring medium transports heat away from a heated surface. Thermal flow sensors are typically composed of a plurality of functional elements, usually at least one low-impedance heating element and one high-impedance resistance element, which serves as a temperature sensor. Alternatively, thermal flow sensors are composed of a plurality of low-impedance heating elements, serving as heaters and temperature sensors.

Calorimetric thermal flow sensors determine the flow or flow rate of the fluid in a channel by way of a temperature difference between two temperature sensors, which are arranged downstream and upstream of a heating element. For this purpose, use is made of the fact that, up to a certain point, the temperature difference is linear with respect to the flow or the flow rate. This procedure or method is described extensively in the relevant literature.

Anemometric thermal flow sensors consist of at least one heating element, which is heated during the measurement of the flow. As a result of the measuring medium flowing around the heating element, heat transport into the measuring medium takes place, which changes with the flow velocity. The flow velocity of the measuring medium can be inferred by measuring the electrical variables of the heating element.

Such an anemometric thermal flow sensor is typically operated in one of the following two control modes:

In the "constant current anemometry" (CCA) control type, a constant current is applied to the heating element. The measuring medium flowing around causes the resistance of the heating element to change, and thus the voltage dropping at the heating element, which represents the measuring signal.

In the "constant temperature anemometry" (CTA) control type, the heating element is maintained at a temperature that, on average, is constant. For this purpose, the heating element is subjected either intermittently to constant power pulses, the frequency of which increases with increasing flow velocity. Alternatively, the value of the current fed into the heating element, or the fed voltage, is increased with increasing flow velocity. Relatively high flow velocities can be measured by means of this control type.

A disadvantage of the previously known thermal flow sensors is that at least two functional elements—a heating element and a temperature sensor—are required. This increases the space requirement and the manufacturing costs of such thermal flow sensors.

SUMMARY

Proceeding from this problem, it is the object of the invention to provide a thermal flow sensor that has a compact design, and a method for operating such a thermal flow sensor.

The object is achieved by a thermal flow sensor for determining the temperature and the flow velocity of a flowing measuring medium, comprising:
  a functional element, which is configured to determine the temperature of the measuring medium and to influence the temperature of the measuring medium; and
  a control and evaluation unit, which is configured to ascertain the temperature of the measuring medium in a first time interval by means of the functional element and to ascertain the flow velocity of the measuring medium in a second time interval following the first time interval.

By using only one functional element, the space requirement of the thermal flow sensor according to the invention is reduced compared to a flow sensor that is known from the prior art and uses two functional elements. The manufacturing costs for such a thermal flow sensor according to the invention are also reduced. The functional element denotes, for example, a single structure of a component which is used to heat or cool the measuring medium and to determine the temperature of the measuring medium. Especially, the functional element is a single layer, which is applied to a substrate. However, a functional element can also denote an entire component if it uses the same structure/the same element for influencing the temperature of the measuring medium and for determining the temperature of the medium.

Influencing the temperature of the measuring medium denotes a heating of the measuring medium or a cooling of the measuring medium.

The thermal flow sensor according to the invention outputs two process variables: the current temperature of the measuring medium, and the current flow velocity of the measuring medium. For this purpose, the thermal flow sensor is operated in a clocked manner in two time intervals, which alternate. In a first time interval, the temperature of the measuring medium is determined; in a second time interval, the flow velocity of the measuring medium is determined. The durations of the time intervals depend on the design of the thermal flow sensor, especially, on the heat transfer from the functional element into the measuring medium, and vice versa, caused by the design of the thermal flow sensor, and the type of measuring medium. The durations of the time intervals are selected, especially, in such a way that the respective measurement variable can be determined with a predetermined accuracy. In experimental tests using a platinum layer as the functional element, a respective duration of 10 minutes has proven to be advantageous for both time intervals. It must be noted, however, that a change in the temperature over time must be below the combined total duration of both time intervals in order to be able to obtain reliable measurement values of the flow velocity.

The term flow velocity, also referred to as flow velocity or flow rate, constitutes a generic term for various information regarding the measured flow. The term flow velocity thus encompasses, for example, the mass flow and/or the volume flow of the measuring medium.

In a first variant of the thermal flow sensor according to the invention, it is provided that the control and evaluation unit is configured to apply an electrical quantity to the functional element in the second time interval in such a way that the functional element has a measuring temperature that is different from the temperature of the measuring medium by a predetermined difference, and to ascertain the flow velocity of the measuring medium based on the electrical quantity required to reach the measuring temperature of the functional element. This corresponds to the "constant temperature anemometry (CTA)" control type. For this purpose, the electronics unit requires the current temperature of the measuring medium, which is determined in the first time interval.

In a second variant of the thermal flow sensor according to the invention, it is provided that the control and evaluation unit is configured to apply, at least intermittently, a defined magnitude of an electrical quantity to the functional element in the second time interval, to detect the temperature of the functional element after the defined magnitude of the electrical quantity has been applied to the functional element, and to ascertain the flow velocity of the measuring medium based on the level of the temperature of the functional element.

To calculate the flow velocity, the magnitude of the difference between the temperature of the functional element after application of the electrical quantity and the temperature of the measuring medium is determined. The higher the current flow velocity of the measuring medium, the lower is the magnitude of the difference. The temperature of the measuring medium required for calculating the magnitude of the difference is determined in the first time interval.

According to a preferred embodiment of the thermal flow sensor according to the invention, it is provided that the control and evaluation unit is a PC or an operating unit. The operating unit can also be a mobile operating unit in the form of a mobile terminal, for example a smart phone or a tablet. Especially, it is provided that the control and evaluation unit is not permanently connected to the functional element and is only connected to the functional element for the operation of the thermal flow sensor.

According to a preferred alternative embodiment of the thermal flow sensor according to the invention, it is provided that the control and evaluation unit is an electronic sensor circuit, which comprises a microprocessor or an operational amplifier. The electronic sensor circuit is, especially, permanently connected, for example wired, to the functional unit.

According to an advantageous embodiment of the thermal flow sensor according to the invention, it is provided that the microprocessor or the operational amplifier is configured to regulate the electrical quantity to be applied to the functional element. However, it can also be an alternative electronic component, which can be used for regulating the electrical quantity and for the evaluation, for example an ASIC.

According to an advantageous embodiment of the thermal flow sensor, it is provided that the electronic sensor circuit comprises a voltage divider or a bridge circuit for determining the resistance value of the functional element.

An advantageous refinement of the thermal flow sensor according to the invention provides that, as a result of the application of the electrical quantity, the functional element is configured so as to have a measuring temperature that is lower than the ascertained temperature of the measuring medium. It is provided that the temperature of the functional element decreases as the magnitude of electrical quantity increases.

For example, the functional element is a Peltier element. A Peltier element is an electrothermal transducer and consists of two materials, especially, two semiconductors, which comprise a contact surface. A temperature difference between the two materials is created by applying an electrical quantity, especially, an electric current. Typically, a Peltier element is configured so as to have a warm side and a cold side when subjected to the electrical quantity. In connection with the thermal flow sensor according to the invention, the Peltier element has to be installed in such a way that the cold side thereof is in thermal contact with the measuring medium, and that the heat generated by the warm side is transported out from the thermal flow sensor, for example by a copper line, etc. As an alternative to a Peltier element, it is also possible to use further electrical cooling elements suitable for briefly cooling the measuring medium.

An advantageous alternative refinement of the thermal flow sensor according to the invention provides that, as a result of the application of the electrical quantity, the functional element is configured so as to have a measuring temperature that is higher than the ascertained temperature of the measuring medium. It is provided that the temperature of the functional element increases as the magnitude of electrical quantity increases.

According to an advantageous embodiment of the thermal flow sensor, it is provided that the functional element is a resistance thermometer, which has a defined relationship between the temperature and the resistance value of the resistance thermometer.

According to a preferred embodiment of the thermal flow sensor, it is provided that the functional element is substantially made of a material having a defined temperature coefficient, especially, platinum, nickel, or polysilicon. Especially, PT50 to PT200 temperature sensors have proven to be advantageous.

In an advantageous embodiment of the thermal flow sensor according to the invention, it is provided that the thermal flow sensor comprises a carrier element into which the functional element is introduced, the carrier element being in contact with the measuring medium. This is, especially, a small metallic tube comprising a closed end region. The small tube is immersed into the measuring medium, especially, perpendicularly to the flow direction. The measuring medium flows through a pipe, for example, but can also flow openly. The functional element is in thermal contact with this end region. Due to the small tube, the functional element is not in contact with the measuring medium.

In the event that the measuring medium flows through a pipe, the functional element can alternatively also be brought directly into thermal contact with the pipe for introduction into a small tube.

According to a preferred embodiment of the thermal flow sensor, it is provided that the thermal flow sensor comprises a substrate having a first thermal resistance value, including a surface facing the measuring medium and including a surface facing away from the measuring medium. The functional element is applied to the substrate, for example by means of a thin-film or thick-film technique. The substrate is substantially made of a ceramic material, for example aluminum oxide or zirconium oxide. Alternatively, the substrate is substantially made of a semiconductor material or of a metallic material.

In an advantageous embodiment of the thermal flow sensor according to the invention, it is provided that the functional element is applied to the surface of the substrate facing the measuring medium, a passivation layer having a second thermal resistance value being applied to the functional element, and the first thermal resistance value of the substrate being essentially greater than the second thermal resistance value of the passivation layer by a factor of at least 10. This arrangement optimizes the sensor element with respect to the heat transfer from the sensor element to a measuring medium, and vice versa. In the direction of the side of the measuring medium, the sensor element has only very low thermal resistance, while high thermal resistance is present in the direction of the surface facing away from the measuring medium. The advantage of the sensor element according to the invention is that good heat transfer from the sensor element to the measuring medium, and vice versa, is achieved.

The Biot number is used for the qualitative analysis of the heat transfer. The Biot number is a dimensionless characteristic of the thermodynamics and flow mechanics fields. It is used to calculate heating and cooling processes and, during the heat transport through the surface of a body, indicates the ratio of the thermal resistivity of a body to the heat transmission resistance of the surrounding measuring medium.

A high Biot number indicates that temperature differences within the solid body are greater than in the boundary layer to the surrounding measuring medium. By designing the thermal flow sensor in accordance with the present exemplary embodiment, the Biot number is reduced.

According to an advantageous embodiment of the thermal flow sensor, a solderable layer is applied to the passivation layer, by means of which the sensor element can be attached to the carrier element. This results in a further reduction of the Biot number since the solderable layer on the passivation layer is in direct contact with the carrier element.

In an advantageous alternative embodiment of the thermal flow sensor according to the invention, it is provided that the functional element is applied to the surface of the substrate facing away from the measuring medium, and a solderable layer being applied to the surface of the substrate facing the measuring medium, by means of which the sensor element can be attached to the carrier element. In this case, a material that is suitable for good thermal conduction between the functional element and the measuring medium should be selected for the substrate.

The object is furthermore achieved by a sensor system, comprising a thermal flow sensor according to the invention and at least one further sensor element, wherein the control and evaluation unit is configured so as to activate the thermal flow sensor and the at least one further sensor element, to determine the temperature and the flow velocity of the measuring medium by means of the thermal flow sensor, and to determine at least one further physical measurement variable by means of the at least one further sensor element. The control and evaluation unit is used jointly for both sensor elements, i.e., both for the thermal flow sensor and for the further sensor element. It is provided that each of the sensor elements comprises a dedicated substrate and/or a dedicated small tube and can also be arranged at a distance from one another. The further sensor element is a sensor type different from the thermal flow sensor. The operator thereby obtains further values regarding additional process variables of the measuring medium, or of the process, in addition to the measurement values of the process variables that are the temperature and the flow velocity.

However, it can also be provided that the sensor system comprises one or more thermal flow sensors according to the invention as the further sensor element. These can be arranged, for example, along a pipe and detect the progression of the flow velocity along the pipe and/or mutually validate measured values of the flow velocity.

In a first variant of the sensor system according to the invention, it is provided that the further sensor element is a conductivity sensor, the further physical measurement variable being a conductivity value of the measuring medium.

In a second variant of the sensor system according to the invention, it is provided that the further sensor element is a moisture sensor, the further physical measurement variable being a moisture value.

The invention is furthermore achieved by a method for determining the temperature and the flow velocity of a measuring medium by means of a thermal flow sensor, wherein the thermal flow sensor comprises a functional element, which is configured to determine the temperature of the measuring medium and to influence the temperature of the measuring medium, and a control and evaluation unit, comprising:

alternately measuring the temperature of the medium by means of the functional element in a first time interval and determining the flow velocity of the measuring medium in a second time interval following the first time interval.

The measurement of the temperature, or the determination of the flow velocity of the measuring medium, and the respective activation of the process medium are undertaken by a control and evaluation unit, which is electrically contacted with the functional element at least for the period of operation of the thermal flow sensor.

In a first variant of the method according to the invention, it is provided that an electrical quantity is applied to the functional element in the second time interval in such a way that a predefined difference between the current temperature of the functional element and the temperature of the measuring medium measured in the first interval is achieved, the flow velocity of the measuring medium being determined based on the level of the electrical quantity that is applied to the functional element. This corresponds to the "constant temperature anemometry (CTA)" control type. For this purpose, the electronics unit requires the current temperature of the measuring medium, which is determined in the first time interval.

In a first variant of the method according to the invention, it is provided that a defined magnitude of an electrical quantity is applied to the functional element in the second time interval, the temperature of the functional element being measured after the application, and the flow velocity of the measuring medium being determined based on the level of the measured temperature of the functional element. To calculate the flow velocity, the magnitude of the difference between the temperature of the functional element after application of the electrical quantity and the temperature of the measuring medium is determined. The higher the current flow velocity of the measuring medium, the lower is the magnitude of the difference. The temperature of the measuring medium required for calculating the magnitude of the difference is determined in the first time interval.

BRIEF DESCRIPTION OF THE DRAWINGS

The invention is explained in greater detail with reference to the following figures. Illustrated are.

DETAILED DESCRIPTION

Figure 1:
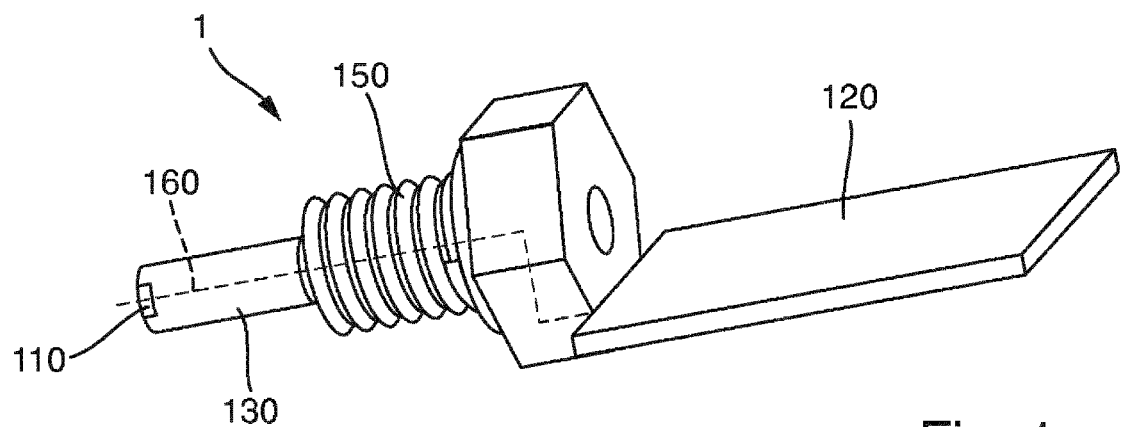
FIG. 1 shows an exemplary embodiment of a thermal flow sensor according to the present disclosure.

FIG. 1 shows an exemplary embodiment of a thermal flow sensor 1 according to the invention. The thermal flow sensor is basically composed of two components.

The first component of the thermal flow sensor 1 is a functional element 110. This functional element 110 is introduced into the interior of a carrier element 130, in the form of a small tube, and is applied to the closed bottom of the small tube 130. Embodiments of the small tube are explained in more detail in FIGS. 3a and 3b.

The second component of the thermal flow sensor 1 is a control and evaluation unit 120. In the present example, this is configured as an electronics unit on a circuit board, is electrically contacted with the functional element 110 by means of one or more cables or wires 160 and is arranged at a distance from the functional element 110. Exemplary embodiments of the function and the electrical circuit of the control and evaluation unit are explained in more detail in FIGS. 4 and 5.

The thermal flow sensor 1 furthermore comprises a process connection 150 to which the small tube 130 and the circuit board of the control and evaluation unit 110 are attached. By means of the thread of the process connection 150, the thermal flow sensor can be introduced into an opening of a pipe 2, through which a measuring medium 210 flows, and can be fixed to the pipe 2. The measuring medium 210 is, especially, a gaseous or a liquid medium.

Figure 2:
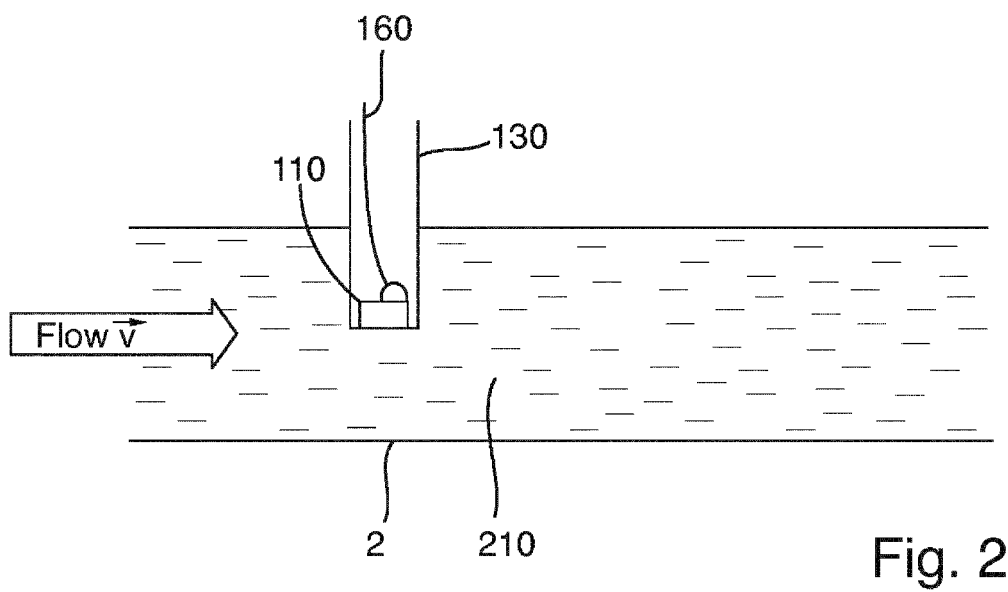
FIG. 2 shows an example of an application of a thermal flow sensor according to the present disclosure.

FIG. 2 shows an example of an application of such a thermal flow sensor 1 according to the invention. As described above, the thermal flow sensor 1 is introduced into the pipe 2 and fixed to a wall thereof. The measuring medium 210 flows through the pipe 2 in the flow direction $\vec{v}$. The thermal flow sensor 1 is introduced into the pipe 2 so as to project into the interior of the pipe 2 perpendicularly to the flow direction $\vec{v}$. The functional element 110 is shielded from the measuring medium 210 by the small tube 130, which is in contact with the measuring medium 210. The functional element 110 is configured and attached to the bottom of the small tube 130 in such a way that sufficiently good heat transfer between the functional element 110 and the measuring medium 210 is ensured for the operation of the thermal flow sensor 1.

Figure 3A:
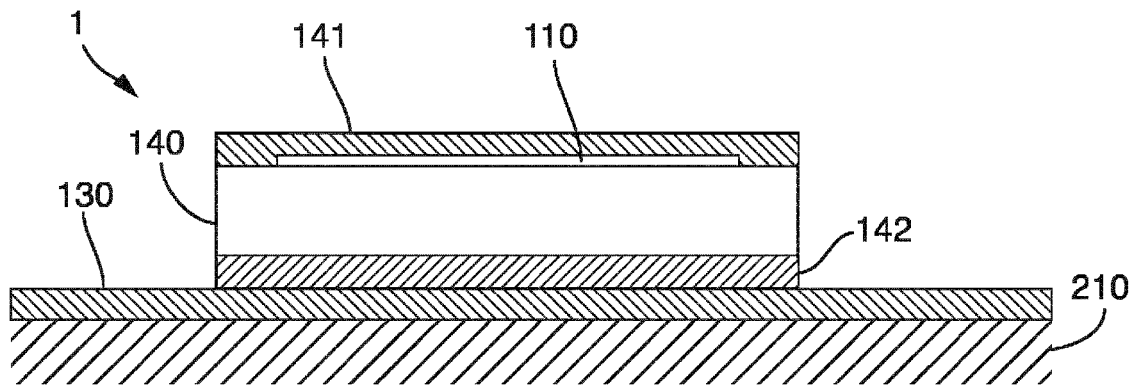
FIG. 3 shows a first and a second exemplary embodiment for a functional element used in a thermal flow sensor according to the present disclosure.

FIG. 3a shows a first embodiment of a functional element 110 of the thermal flow sensor 1 which is attached to the pipe 2. The functional element 110 is applied onto a substrate 140. The functional element itself is covered by a passivation layer 141.

The functional element 110 is a layer of a material having a defined temperature coefficient of the electrical resistance, which is dissimilar from zero. Depending on the temperature coefficient of the material used, the functional element 110 thus forms a positive temperature coefficient (PTC) thermistor or a negative temperature coefficient (NTC) thermistor. Especially, the functional element 110 is made of a metallic material, especially, platinum, nickel, or copper, or of a polycrystalline or doped semiconductor material, especially, silicon, germanium or gallium arsenide.

The functional element 110 is used to determine the temperature of the measuring medium 210 by determining the temperature-dependent resistance value of the functional element 110. The functional element is also designed to generate Joule heat, which is emitted to the measuring medium 210, when subjected to an electrical quantity.

The surface of the substrate 140 facing the measuring medium 210 is attached to the small tube 130 by means of a solder layer 142.

By selecting suitable materials for the substrate 140, for example aluminum nitride, which has very high thermal conductivity, a low Biot number is achieved between the functional element 110 and the measuring medium 210. By reducing the layer thickness of the substrate 140, a Biot number <0.1 can be achieved, which means almost optimal transfer of heat from the functional element 110 to the measuring medium 210, or vice versa.

Figure 3B:
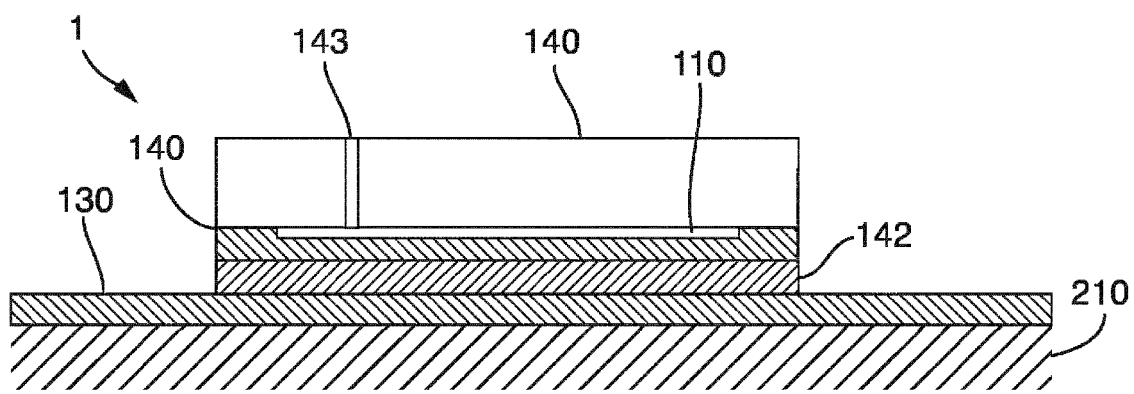

FIG. 3b shows a first embodiment of a functional element 110 of the thermal flow sensor 1 attached to the pipe 2.

The substrate 140 is made of zirconium oxide having a layer thickness of approximately 150 µm. This has relatively low thermal conductivity.

In this example, the functional element 110 is applied to the surface of the substrate 140 facing the measuring medium 210. In this example as well, the functional element 110 is a layer made of a material having a defined temperature coefficient of the electrical resistance which is dissimilar from zero. Depending on the temperature coefficient of the material used, the functional element 110 thus forms a positive temperature coefficient (PTC) thermistor or a negative temperature coefficient (NTC) thermistor. Especially, the functional element 110 is made of a metallic material, especially, platinum, nickel, or copper, or of a polycrystalline or doped semiconductor material, especially, silicon, germanium or gallium arsenide.

A passivation layer 141 is applied onto the functional element 110. In this exemplary embodiment, the passivation layer 141 is made of $Al_2O_3$ and has a layer thickness of approximately 3 µm. The passivation layer 141 has a considerably lower thermal resistance value, especially, smaller by at least a factor of 10, than the substrate 140. This ensures that a heat flow is directed from the functional element 110 to the measuring medium 210, or from the measuring medium 210 to the functional element 110, and as little heat as possible is lost through the substrate 140.

The passivation layer 141 is configured in such a way that a solderable layer 142 can be applied thereto, and the substrate 140 with the functional element 110 is attached to the small tube 130 by means of this solderable layer 142. This results in a further reduction of the Biot number since the solderable layer 142 on the passivation layer 141 is in direct contact with the small tube 130.

This embodiment has a Biot number of less than 1 and therefore allows good thermal conduction from the functional element 110 to the measuring medium 210, and vice versa.

One or more vias 143 can be provided in the side of the substrate 140 facing away from the measuring medium 210. The wires 160 thereby contact the functional element 110 from the side of the substrate 140 located opposite the functional element 110. If the contact surface of the functional element 110 including the small tube 130 is larger, greater heat transfer arises, with the chip dimensioning remaining the same, or the dimensioning of the functional element 110 is reduced, with the contact surface remaining the same.

Alternatively to the functional element 110 being applied to the substrate 140 as a thin layer or thick layer, the functional element can also be a finished component, for example a PT50 to PT200 resistance thermometer, which is applied to the bottom of the small tube 130, for example by way of soldering.

Figure 4:
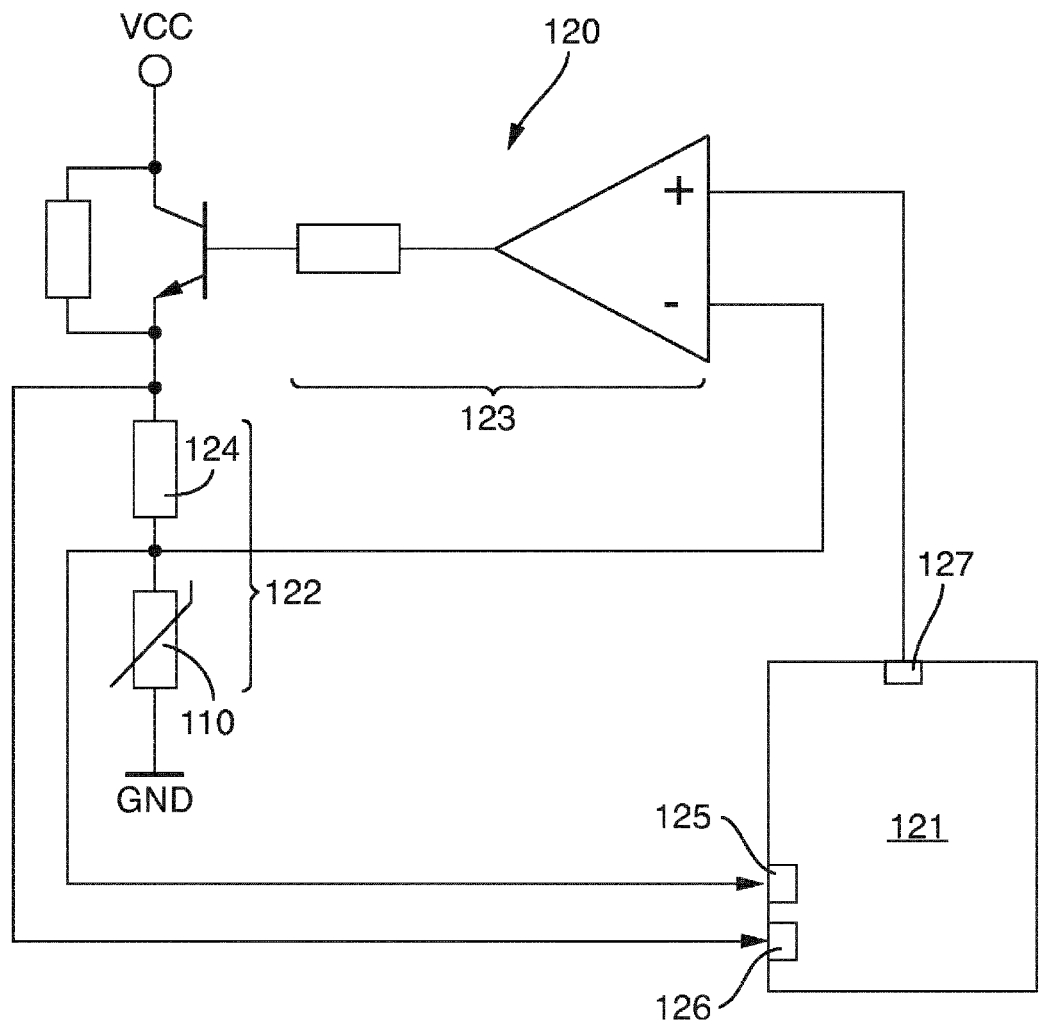
FIG. 4 shows a first embodiment of a control/evaluation unit for a thermal flow sensor according to the present disclosure.

FIG. 4 shows a first embodiment of an electronic circuit of a control/evaluation unit 120 for a thermal flow sensor 1 according to the invention. The control and evaluation unit 120 is used to operate the thermal flow sensor 1 in a clocked manner in two time intervals which alternate. In a first time interval, the temperature of the measuring medium 210 is determined; in a second time interval, the flow velocity of the measuring medium 210 is determined.

The two time intervals are controlled by a microprocessor 121. In the first time interval, the microprocessor 121 calculates the temperature of the measuring medium 210. For this purpose, the microprocessor ascertains the current resistance value of functional element 110. The functional element 110 is connected in series with a series resistor 124 and forms a voltage divider 122 therewith. The current value of the resistance of the functional element 110 changes as a function of the temperature of the measuring medium 210. The microprocessor 121 determines the resistance value based on the voltage dropping across the functional element 110 and the current flowing in the voltage divider 122, which is calculated from the known resistance value of the series resistor 124 and the voltage value dropping across the series resistor 124. For this purpose, the microprocessor 121 comprises an integrated analog-to-digital converter including two inputs 125, 126: an input 126 for the voltage dropping across the entire voltage divider, and an input 125 for the voltage dropping across the functional element 110. To measure the temperature of the measuring medium 210, the voltage divider is only subjected to a low voltage value, for example in the range of 0.1 to 1.0 V. The analog-to-digital converter can alternatively be configured as an external element, which is connected to the microprocessor 121.

After determining the temperature of the measuring medium 210 in the first time interval, the flow velocity of the measuring medium 210 is determined in the second time interval. Two different methods can be applied in the process:

In a first variant, an electrical quantity is applied to the functional element 110 in such a way that a predefined difference between the current temperature of the functional element 110 and the temperature of the measuring medium 210 measured in the first interval is achieved. The flow velocity of the measuring medium 210 is then determined based on the level of the electrical quantity applied to the functional element, which corresponds to the "constant temperature anemometry (CTA)" control type. For this purpose, the control and evaluation unit 120 requires the current temperature of the measuring medium 210, which was determined in the first time interval.

Specifically, an electrical quantity, especially, a voltage, is applied to the functional element 110 in the second time interval. The level of the voltage is established by an output 127 of a digital-to-analog converter implemented in the microprocessor. The voltage value output by the output 127 is amplified by an amplification element 123. At the same time, the current temperature of the functional element is determined by means of the voltage values currently dropping across the inputs 125, 126. If the current temperature does not correspond to the magnitude of the difference compared to the temperature of the measuring medium 210, the microprocessor changes the level of the voltage until the predetermined difference is reached.

In a second variant, a defined magnitude of an electrical quantity is at least intermittently applied to the functional element 110. After the defined electric power has been applied to the functional element 110, the temperature of the functional element 110 is detected in the known manner. The flow velocity of the measuring medium is subsequently ascertained by the microprocessor 121 based on the level of the temperature of the functional element 110.

Figure 5:
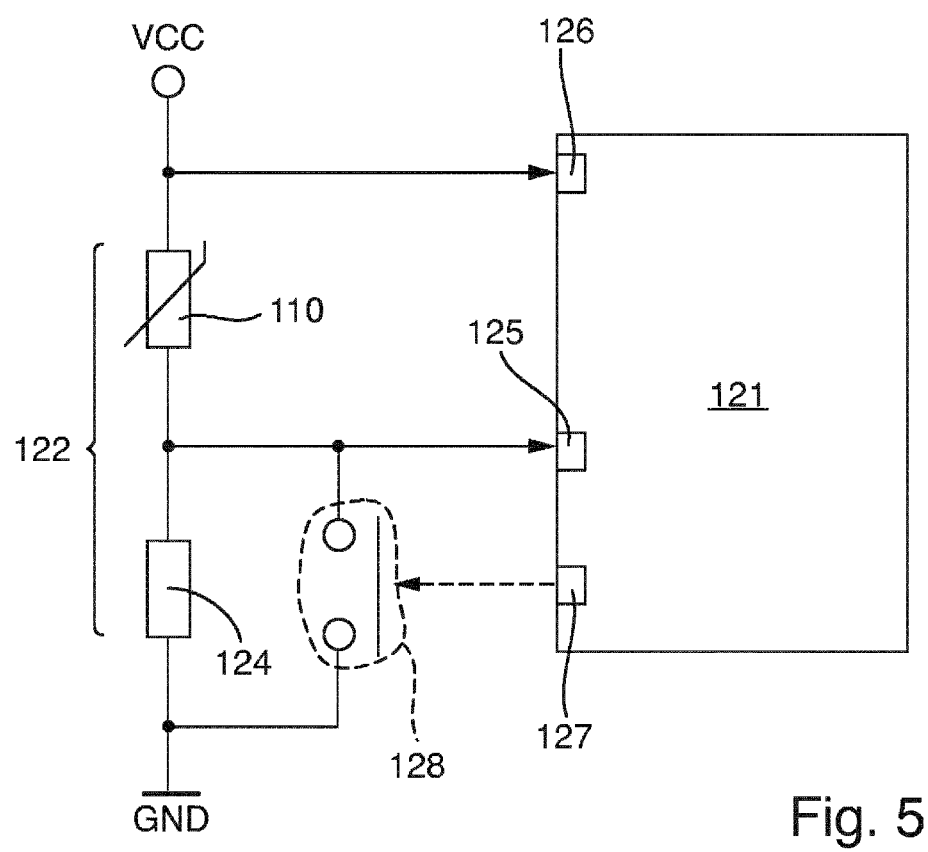
FIG. 5 shows a second embodiment of a control/evaluation unit for a thermal flow sensor according to the present disclosure.

FIG. 5 shows a second embodiment of an electronic circuit of a control/evaluation unit 121 for a thermal flow sensor according to the invention.

This electrical circuit differs from the electrical circuit shown in FIG. 4 in that it does not comprise an external control element 123. The control element is implemented as application software in the microprocessor 121. The microprocessor 121 likewise comprises the two inputs 125, 126 described in FIG. 4. In this exemplary embodiment, the series resistor 124 is connected between the functional element and ground GND and is therefore, strictly speaking, not a series resistor. A switching element 128, which is connected to ground GND, is connected in parallel to the functional element 110. The switching element 128 is connected to the output 127 of a pulse width regulator of the microprocessor 121 and closes with each outgoing pulse. The frequency of the pulses in the second time interval is, for example, in a range of 1 kHz to 2 kHz.

The temperature of the measuring medium 210 is calculated in a manner analogous to that described for FIG. 4. The switching element is open in the process. The voltage VCC present at the voltage divider 122 is low, for example in a range of 0.1 to 1.0 V.

The flow velocity of the measuring medium is calculated in a manner analogous to that described for FIG. 4. Both methods can also be used here. The voltage VCC present at the voltage divider 122 is increased, for example to a range of 4.8 to 5 V. The level of the incoming power is determined in this case by way of the duty cycle of the pulses. If more pulses are applied to the functional element 110 in the same time, the heat generated by the functional element 110 increases.

The flow sensor 1 according to the invention has a number of advantages: By using only one functional element 110, the space requirement of the thermal flow sensor 1 according to the invention is reduced compared with a flow sensor that is known from the prior art and uses two functional elements. The manufacturing costs for such a thermal flow sensor 1 according to the invention are also reduced.

The flow sensor 1 according to the invention is not limited to the exemplary embodiments shown in FIGS. 1 to 5. For example, it can be provided that the control and evaluation unit is formed by a PC or an operating unit and is not attached to the actual housing of the thermal flow sensor 1.

Alternatively, it can also be provided that the functional element 110 or the substrate 140 with the applied functional element 110 is in direct contact with the measuring medium 210 and is not introduced into a carrier element 130. The functional element 110 or the substrate 140 with the applied functional element 110 can alternatively also be applied to a wall of the pipe 2.

It can also be provided that the functional element 110 is not used for heating the measuring medium 210, but for (temporarily) cooling the measuring medium 110. In such a case, the functional element is configured as a Peltier element, for example. The circuit of the control and evaluation unit 120 remains virtually identical in this case.

The invention claimed is:

1. A thermal flow sensor for determining a temperature and a flow velocity of a flowing measuring medium, comprising: a functional element configured to determine the temperature of the measuring medium and to influence the temperature of the measuring medium; a carrier element into which the functional element is introduced, the carrier element being in contact with the measuring medium; a substrate having a first thermal resistance value, wherein the substrate includes a surface facing the measuring medium and a surface facing away from the measuring medium, and wherein the functional element is applied to the surface of the substrate facing away from the measuring medium; a solderable layer applied to the surface of the substrate facing the measuring medium, wherein the substrate is attached to the carrier element inside the carrier element via the solderable layer; and a control and evaluation unit configured to ascertain the temperature of the measuring medium in a first time interval using the functional element and to ascertain the flow velocity of the measuring medium in a second time interval following the first time interval, wherein the substrate is dimensioned such that a Biot number between the functional element and the measuring medium is less than 0.1.

2. The thermal flow sensor according to claim 1, wherein the control and evaluation unit is further configured to apply an electrical quantity to the functional element in the second time interval such that the functional element has a measuring temperature that is different from the temperature of the measuring medium by a predetermined difference, and wherein the control and evaluation unit is further configured to ascertain the flow velocity of the measuring medium based on the electrical quantity required to reach the measuring temperature of the functional element.

3. The thermal flow sensor according to claim 2, wherein the functional element is configured so as to have the measuring temperature that, as a result of the application of the electrical quantity, is lower than the ascertained temperature of the measuring medium.

4. The thermal flow sensor according to claim 2, wherein the functional element is configured so as to have the measuring temperature that, as a result of the application of the electrical quantity, is higher than the ascertained temperature of the measuring medium.

5. The thermal flow sensor according to claim 4, wherein the functional element is a resistance thermometer which has a defined relationship between the temperature and the resistance value of the resistance thermometer.

6. The thermal flow sensor according to claim 5, wherein the functional element is made of a material having a defined temperature coefficient.

7. The thermal flow sensor according to claim 1, wherein the control and evaluation unit is further configured to apply a defined magnitude of an electrical quantity to the functional element in the second time interval, to detect the temperature of the functional element after the defined magnitude of the electrical quantity has been applied to the functional element, and to ascertain the flow velocity of the measuring medium based on the temperature of the functional element.

8. The thermal flow sensor according to claim 1, wherein the control and evaluation unit is a PC or an operating unit.

9. The thermal flow sensor according to claim 1, wherein the control and evaluation unit is an electronic sensor circuit including a microprocessor or an operational amplifier.

10. The thermal flow sensor according to claim 9, wherein the microprocessor or the operational amplifier is configured to regulate the electrical quantity to be applied to the functional element.

11. The thermal flow sensor according to claim 9, wherein the electronic sensor circuit further includes a voltage divider or a bridge circuit for determining a resistance value of the functional element.

12. A sensor system, comprising: a thermal flow sensor, including: a functional element is configured to determine a temperature of a measuring medium and to influence the temperature of the measuring medium; a carrier element into which the functional element is introduced, the carrier element being in contact with the measuring medium; a substrate having a first thermal resistance value, wherein the substrate includes a surface facing the measuring medium and a surface facing away from the measuring medium, and wherein the functional element is applied to the surface of the substrate facing away from the measuring medium; a solderable layer applied to the surface of the substrate facing the measuring medium, wherein the substrate is attached to the carrier element via the solderable layer; and a control and evaluation unit configured to ascertain the temperature of the measuring medium in a first time interval using the functional element and to ascertain a flow velocity of the measuring medium in a second time interval following the first time interval, wherein the substrate is dimensioned such that a Biot number between the functional element and the measuring medium is less than 0.1; and at least one further sensor element, wherein the control and evaluation unit is configured to activate the thermal flow sensor and the at least one further sensor element, to determine the temperature and the flow velocity of the measuring medium using the thermal flow sensor, and to determine at least one further physical measurement variable using the at least one further sensor element.

13. The sensor system according to claim 12, wherein the at least one further sensor element is a conductivity sensor, the at least one further physical measurement variable being a conductivity value of the measuring medium.

14. The sensor system according to claim 12, wherein the at least one further sensor element is a moisture sensor, and the at least one further physical measurement variable being a moisture value.

15. A method for determining a temperature and a flow velocity of a measuring medium, comprising: providing a thermal flow sensor, including: a functional element configured to determine the temperature of the measuring medium and to influence the temperature of the measuring medium; a carrier element into which the functional element is introduced, the carrier element being in contact with the measuring medium; a substrate having a first thermal resistance value, wherein the substrate includes a surface facing the measuring medium and a surface facing away from the measuring medium, and wherein the functional element is applied to the surface of the substrate facing away from the measuring medium; a solderable layer applied to the surface of the substrate facing the measuring medium, wherein the substrate is attached to the carrier element via the solderable layer; and a control and evaluation unit, wherein the first thermal resistance value is dimensioned such that a Biot number between the functional element and the measuring medium is less than 0.1; alternately measuring the temperature of the medium using the functional element in a first time interval; and determining the flow velocity of the measuring medium in a second time interval following the first time interval.

16. The method according to claim 15, further comprising:
applying an electrical quantity to the functional element in the second time interval such that a predefined difference between a current temperature of the functional element and the temperature of the measuring medium measured in the first interval is achieved; and
determining the flow velocity of the measuring medium based on a level of the electrical quantity that is applied to the functional element.

17. The method according to claim 15, further comprising: applying a defined magnitude of an electrical quantity to the functional element in the second time interval; measuring a temperature of the functional element after the application; and determining the flow velocity of the measuring medium based on the measured temperature of the functional element.

* * * * *